June 25, 1940. E. J. LOBDELL, JR Re. 21,490

METHOD OF FABRICATING RIMS

Original Filed July 12, 1934 4 Sheets-Sheet 1

Inventor

By E. J. Lobdell, Jr.

Watson, Cole, Grindle & Watson, Attorneys

June 25, 1940.

E. J. LOBDELL, JR

Re. 21,490

METHOD OF FABRICATING RIMS

Original Filed July 12, 1934

4 Sheets-Sheet 2

Inventor

By E. J. Lobdell, Jr.

Watson, Cole, Grindle & Watson

Attorney

June 25, 1940. E. J. LOBDELL, JR Re. 21,490

METHOD OF FABRICATING RIMS

Original Filed July 12, 1934 4 Sheets-Sheet 3

Inventor

E. J. Lobdell, Jr.,

By Watson, Cole, Grosh & Gindle

Attorneys

June 25, 1940. E. J. LOBDELL, JR Re. 21,490

METHOD OF FABRICATING RIMS

Original Filed July 12, 1934 4 Sheets-Sheet 4

Inventor

By Ed. J. Lobdell, Jr.

Watson, Cole, Grindle & Watson

Attorneys

Reissued June 25, 1940

Re. 21,490

UNITED STATES PATENT OFFICE 21,490

METHOD OF FABRICATING RIMS

Edward J. Lobdell, Jr., Alma, Mich., assignor to The Lobdell-Emery Manufacturing Company, Alma, Mich., a corporation of Michigan Original No. 2,080,866, dated May 18, 1937, Serial No. 734,846, July 12, 1934. Application for reissue May 17, 1939, Serial No. 274,307

11 Claims. (Cl. 29—159.1)

The present invention relates to methods of fabricating rims and refers more particularly to methods of fabricating rims of that type having a well, such as a drop-center rim.

Various methods of manufacture of metallic rims have heretofore been suggested or put into practice and it is the purpose of the present invention to provide an improved method whereby metallic rims may be made with greater ease and less cost than has heretofore been possible.

The invention has for another object to provide a method of such character that rims produced in accordance therewith will be superior to metallic rims produced by methods heretofore used or suggested.

The improved method is particularly suitable for the fabrication of rims of corrosion-resisting metal, the use of which metal is highly advantageous in the fabrication of rims for vehicle wheels, and particularly bicycle and motor cycle wheels.

In the practice of the approved process or method, rims of great strength and rigidity for a given weight of metal are easily formed and particularly in the case of bicycle rims they may be formed preferably from comparatively thin strips of an alloy of iron and chromium, or an alloy of iron, chromium and nickel, having the desired rust and corrosion resisting properties. The method is of such nature that the resulting rim has a more satisfactory cross sectional contour than metallic rims fabricated in accordance with other processes and is more durable in use, having substantially no initial internal stress in the metal of which it is fabricated so that it will maintain its shape under severe treatment.

It has heretofore been the practice in the fabrication of rims to first submit a metal strip of the proper length to a rolling operation or a series of rolling operations, the metal strip being passed longitudinally through stationary rolls which act upon the strip to give it the desired cross section and the desired curvature. Thereafter, the ends of the strip are secured together in any suitable manner, as by welding. It is found, however, that the rolling operations do not satisfactorily distribute the metal, considering a transverse cross section through the rim, and furthermore, that a wheel having a rim fabricated in this manner has a strong tendency to spring out of shape when in use due to the fact that the metal of the rim itself is under an initial internal strain set up by the rolling operation.

As distinguished from the prior method of manufacture involving the rolling of a band or strip by passing the band through a stationary rolling device and in which the various cross sectional areas of the band are successively acted upon, the present invention contemplates deformation of all cross sections of the rim simultaneously in the formation of its lateral tire supporting flanges. A continuous band of the desired diameter is first formed and those portions of the band the diameters of which it is desired to increase are then subjected to outwardly directed expanding forces exerted uniformly and simultaneously around the periphery of the rim so that all areas of an annular section of the rim which is to be stretched, expanded or deflected outwardly are subjected at one time to the expanding operation. There is thus no longitudinal working of the metal, as is the case where the rim is rolled to desired form, but all forces are applied simultaneously at all points.

The metal is, of course, stretched beyond its elastic limit and takes a permanent set, but after being so stretched uniformly through all cross sections of the rim there are no internal stresses in the metal which tend to draw the rim out of shape when in use and, as a result, the rim maintains its original shape under adverse conditions and when subjected to the shocks incident to its use on rough roads, or in like places.

For carrying out the method, various types of apparatus may be employed, the method not being limited in this respect, and for the purpose of adequately disclosing the method, one type of apparatus for practicing the same which has been found to be entirely adequate in practice is illustrated in the accompanying drawings, by way of example.

The first step in the formation of the rim is the fabrication of a blank from which the rim is to be shaped. A strip of ductile metal is selected. The ends of the strip are placed end to end and welded, the welding operation being a butt-welding operation and preferably performed with the assistance of an electric welding machine. The blank thus formed has an internal diameter the same as that of the finished rim and is sufficiently wide to permit the subsequent shaping operations to be performed and to give a finished rim of the desired cross section, which is that of a drop-center rim. In the manufacture of a bicycle rim, a strip of relatively thin ductile metal is selected and preferably this metal is an alloy of iron, chromium and nickel, which not only has the requisite ductility, but possesses the desired corrosion and rust-resisting properties.

Figure 1:
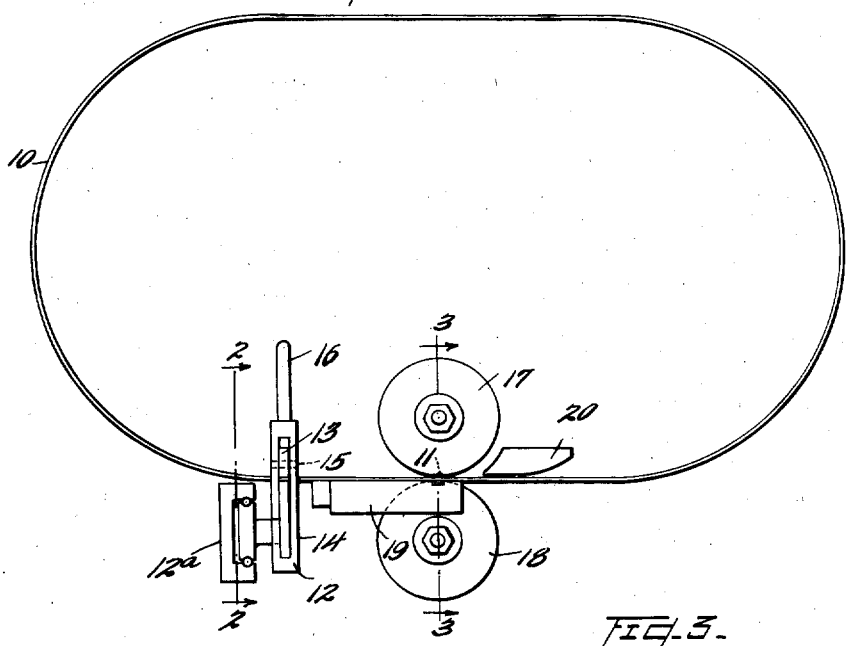
Figure 1 is a front elevation of a simple form of apparatus for removing the "flash" or excess welding material from the continuous band which is to be subsequently formed into the wheel rim, at the point where the two ends of the band are secured together by a weld.
Figure 2:
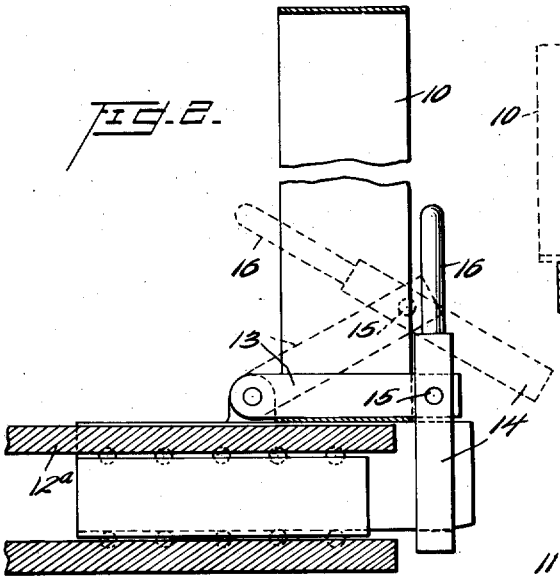
Figure 2 is a section on line 2—2 of Figure 1.
Figure 3:
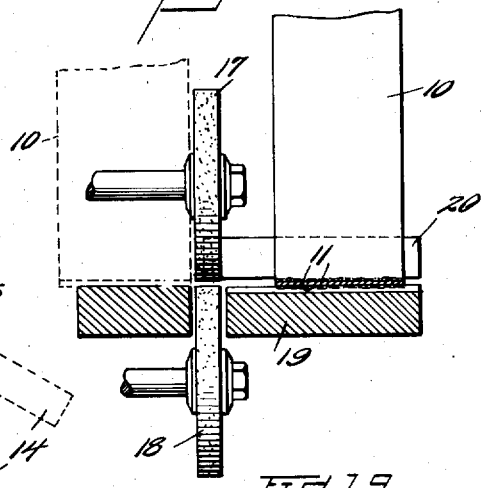
Figure 3 is a section on line 3—3 of Figure 1.
Figure 13:
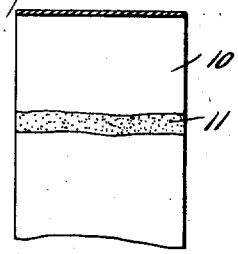
Figure 13 is a cross section through the endless band or strip which comprises the blank from which the rim is to be fabricated.

The blank is indicated in side elevation at 10 in Figure 1 and in cross section in many of the other figures. As a result of the welding operation, excess welding material or "flash" remains on the blank, this "flash" being indicated at 11 in Figures 3 and 13. It is necessary to remove this excess material, and for this purpose the mechanism illustrated in Figures 1, 2 and 3 is provided. The blank 10 is first clamped to a slide 12 by means of any suitable clamping device, the slide 12 being mounted upon a support 12[a] for free sliding movements from right to left (Figures 2 and 3). The clamp employed may comprise simply a lever 13, pivoted at one end to slide 12, and a securing yoke 14 pivoted at 15 to the free end of member 13 and having a rectangular aperture to receive the outer end of the slide 12. An operating handle for member 14 is indicated at 16, and by manipulating handle 16 the clamping member 13 may be moved from the position in which it is shown in dotted lines in Figure 2 to the position in which it is shown in full lines in this figure, the blank 10 being thus firmly clamped to slide 12. Grinding wheels are indicated at 17 and 18 mounted to rotate about parallel axes, which axes are also parallel to the path of movement of the slide 12, the peripheries of these wheels being spaced apart a distance equal to the thickness of the blank 10.

By moving the slide 12 to the left (Figure 2) the butt-weld 11 is moved between the grinding wheels and the excess welding material removed by the grinding wheels so that the surface of the blank at the welded joint is smooth, and the thickness of the blank at this point is rendered the same as the thickness at all other points. For guiding the blank while passing between the grinding wheels 17 and 18, lower and upper guides 19 and 20 respectively are provided. After the grinding operation has been completed, the blank is removed and is then ready for the subsequent shaping operations.

Figure 4:
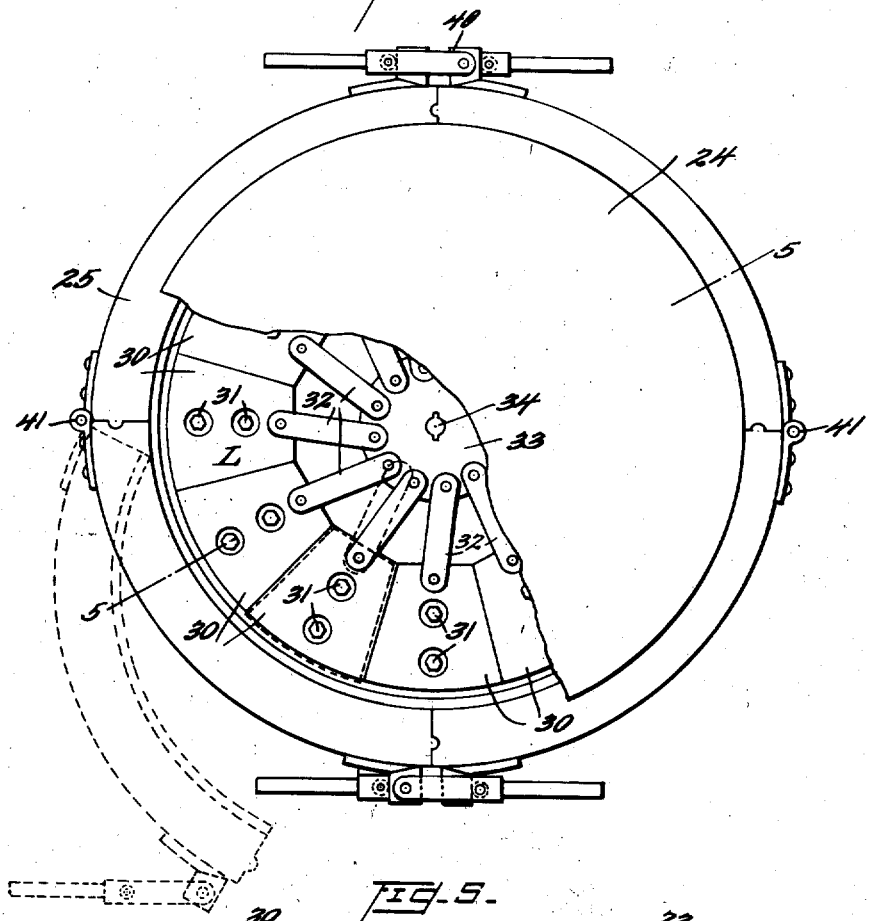
Figure 4 is a top plan view, partially broken away, of one of the dies provided for expanding the margins of the endless band or blank to form the tire retaining flanges of the rim.
Figure 5:
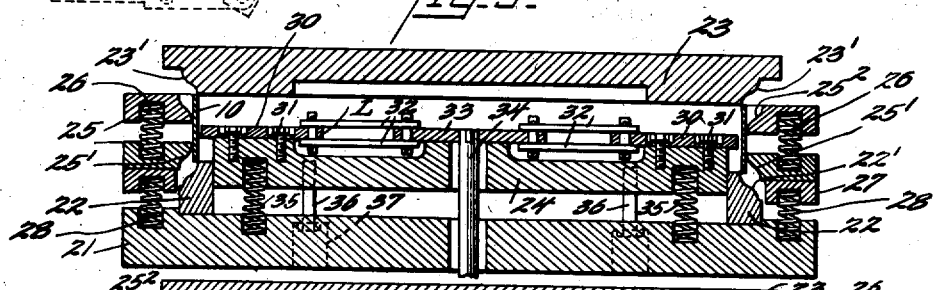
Figure 5 is a section on line 5—5 of Figure 4.
Figure 6:
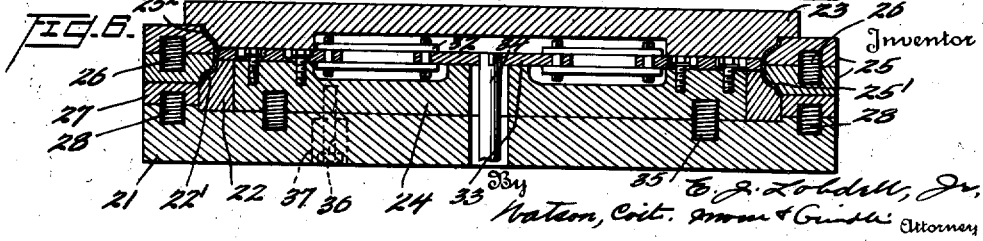
Figure 6 is a section similar to the section shown in Figure 5 but showing the parts of the die in closed position.

In Figures 4, 5 and 6 a die is disclosed for effecting the first expanding operations performed upon the two lateral edges of the blank. This die includes a base member 21 having the general shape of a circular disc, a lower die member 22 in the form of a ring mounted upon base 21, an upper die member 23, an intermediate supporting disc 24, and an outer two-part confining ring 25. The blank engaging and shaping surfaces of the upper and lower dies are indicated at 22′ and 23′, respectively, and are similar in contour, as shown, being generally conical but reversely curved, the corresponding surfaces with which these two last mentioned surfaces cooperate being indicated at 25′ and 25[2], respectively, which last mentioned surfaces are formed upon the similar upper and lower parts or sections of the confining ring 25. When initially positioned in the die, the blank 11 rests upon the upper edge of the lower die member 22, and its mid-section lies opposite the space intermediate the upper and lower sections of the confining ring 25, these sections being spaced apart by the spring 26, and the confining ring as an entirety being supported upon an annular member 27 which is in turn supported upon the base by a plurality of coiled springs 28.

When thus positioned, the inner surface of the blank is engaged and frictionally gripped by a segmental expanding plate, indicated generally at L, which is mounted upon the disc-like intermediate supporting member 24. The expanding plate comprises a plurality of similar segmental sections 30 slidably mounted upon the upper surface of member 24 and held against vertical displacement by cap bolts 31, the heads of which rest in slots formed in the several segments respectively. Each segment 30 of the expanding plate is connected by means of toggle levers 32 with a central disc 33 to which the upper end of a rotatable operating shaft 34 is keyed or otherwise suitably secured. By rotating shaft 34, the disc 33 is caused to rotate and the inner ends of the toggle members 32 are moved circumferentially so that each exerts an outward thrust upon the segmental plate 30 to which it is connected, this outward movement being sufficiently great in extent to result in the engagement of the curved outer edge of each segmental plate with the adjacent surface of blank 11, the central portion of the blank being therefore frictionally gripped by the expanding plate.

In its movement, each toggle 32 moves angularly approximately to the extent indicated in Figure 4, in which figure one of the toggles is illustrated in its two extreme positions by means of full and dotted lines, the associated segment 30 being disengaged when the toggle is in the full-line position and fully engaged when the toggle is in its dotted-line position. Preferably, in its swinging movement from full to dotted-line position, the toggle passes through a truly radial position, and means is provided for preventing further rotation of disc 38 so that segments 30 are locked in their engaged positions and will remain locked in engagement with the blank 11 until released by further operation of shaft 34. The intermediate supporting member 24 is so dimensioned that its cylindrical outer edge makes a rather close sliding fit with the cylindrical inner surface of the lower ring die 22 so that this member is maintained in a central position at all times.

Member 24 is also supported upon the base 21 by means of springs 35, the upward movement of the member under the influence of springs 35 being limited by means of the stop bolts 36, the threaded ends of which are secured to member 24 and the heads of which move in apertures 37 formed in bottom support 21. The means for supporting the upper die 23 is not illustrated, but it will be understood that this upper die may be secured to the upper pressure head of a press if desired or may be an entirely independent member.

For convenience in assembling and disassembling the outer confining ring, it is preferably formed in two principal parts, the adjacent ends of which may be locked in close contact by any suitable latching or locking devices, such for instance as are indicated at 40 in Figure 4. For the further convenience of the operator in assembling and disassembling the confining ring, each part may be formed in two segments hingedly connected together as by means of hinges 41.

Figure 14:
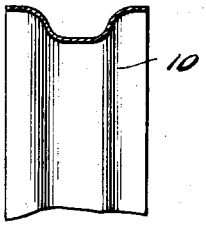
Figures 14 and 15 illustrate the rim in cross section after the first and second expanding operations have been performed, respectively.

After the blank 11 has been positioned, as shown in Figure 5, and the upper die 23 and confining ring 25 have likewise been so positioned and also after the segmental expanding plate L has been moved into engagement with the blank 11, pressure may be applied to the upper die member 23 or simultaneously to the upper die member and the base 21 to cause the dies 22 and 23 to approach each other. The application of the pressure is continued until the various parts occupy the positions in which they are shown in Figure 6, the two parts of the confining ring 25 being then in contact and the adjacent parallel surfaces of the upper and lower dies being in contact with the upper and lower surfaces of the segmental expanding plate L. During this movement the effective surfaces of the dies exert progressively increasing, outwardly directed, expanding forces upon the upper and lower marginal edges of the blank, and upon the completion of the movement both edges are equally outwardly expanded or curved so that in cross section the blank appears as shown in Figure 14. After the completion of this operation, the upper die 23 is removed, the confining ring 25 disassembled, and the segmental expanding plate L disengaged, whereupon the blank may be taken from the die and made ready for the next operation.

Figure 7:
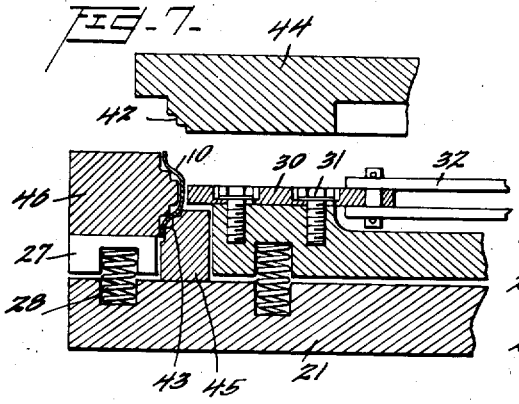
Figures 7 and 8 are partial sections through a die generally similar to that shown in Figures 4, 5, and 6 for performing a subsequent operation upon the partially completed rim, the die being shown open in Figure 7 and closed in Figure 8.
Figure 8:
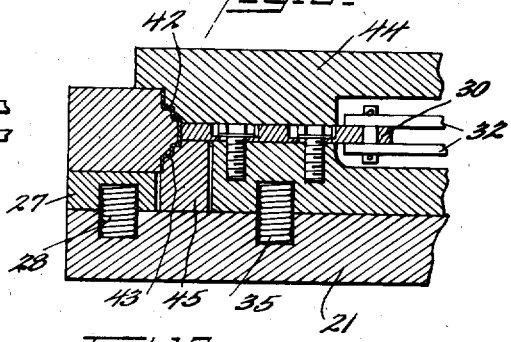

The die press for performing the next operation is illustrated in part in Figures 7 and 8. It is generally similar to the press illustrated in Figures 4, 5 and 6, differing only in that the effective surfaces 42 and 43 of the upper and lower die members 44 and 45, respectively, have contours different from the corresponding surfaces of the dies previously described, and the corresponding effective surfaces of the confining ring 46 are similarly but reversely shaped. Likewise, the confining ring 46 is solid in cross section, instead of being formed in two parts separated by springs, as in the previous die press. Otherwise the various parts of this die press are similar to those of the die press shown in Figures 4, 5 and 6.

Figure 15:
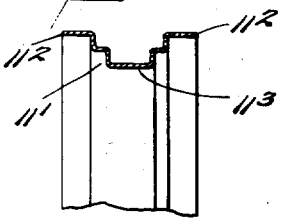
Figure 16:
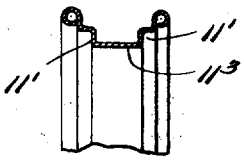
Figure 16 illustrates the rim in section after its lateral edges have been spun or turned.

After being subjected to the action of the die press shown in Figures 7 and 8, the blank is removed, and a cross section thereof is illustrated in Figure 15, the operation just described having resulted in the formation of a blank having the well, the bead seats and the flanges of a drop-center rim, the marginal edges of the flanges, however, being of a form different from those of the final rim, as shown. It will be noted that during this operation the internal diameter of that portion for forming the base of the well of the rim is maintained by the confining ring 46 and the associated segmental expanding plate, while the previously expanded portions of the blank on opposite sides of the well base portion are refashioned to form the sides of the well, the bead seats, and the flanges, there being a comparatively sharp shoulder 11' intermediate the outer margins or edges $11^2$ of the blank and the well base or generally cylindrical center part $11^3$. It will also be noted that the expanded portions while being refashioned are capable of moving laterally or axially inward or toward each other in a manner such that their gauge or thickness is not appreciably affected.

Figure 9:
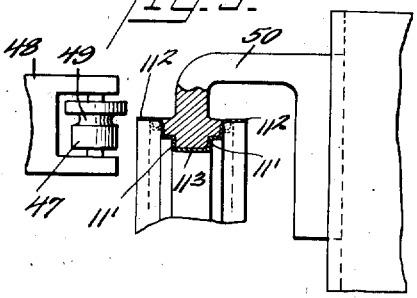
Figures 9 and 10 are two views of the means employed for spinning or turning over the lateral edges of the rim.
Figure 10:
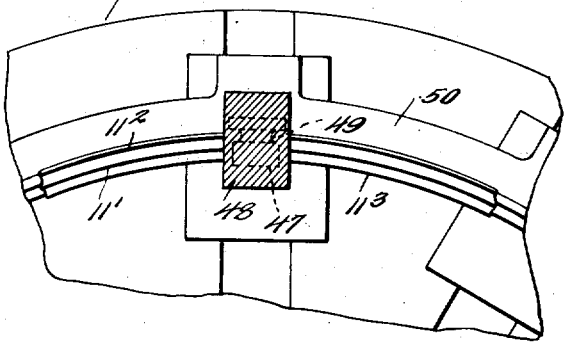

The marginal edges $11^2$ are then inturned or formed into beads of circular cross section, preferably by a spinning operation. While this operation may be performed upon any suitable apparatus, a means for conveniently forming the beads is illustrated in Figures 9 and 10, a hardened roller 47 rotatably mounted in a suitable support 48 and having a groove 49 of the desired shape being pressed against the edge $11^2$ of the blank while the blank is suitably supported in a chuck 50 and either rotated relatively to the roller support 48 or held stationary while the roller support is rotated relatively to the chuck, as desired. The position of the blank will be reversed between spinning operations in order that both edges 11' may be inturned, as shown.

It is next necessary to perforate the well base or cylindrical central portion $11^3$ of the blank as a step preliminary to the formation of the means for retaining the spoke end attaching sleeves or nuts and also to perforate this portion of the blank for the reception of the cylindrical tube by means of which the tire mounted upon the rim may be inflated. These punching operations may be performed in any suitable manner or upon any suitable type of machine, of which the machine shown in Figures 11 and 12 is an example.

Figure 11:
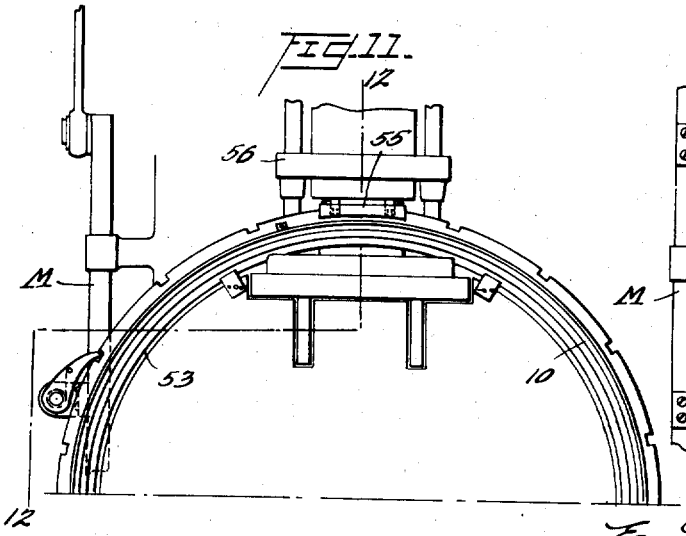
Figure 11 is a front elevation of a mechanism for punching the rim at spaced intervals around the periphery thereof, a step preliminary to the formation of the elements which are to subsequently receive the spoke end attaching devices.
Figure 12:
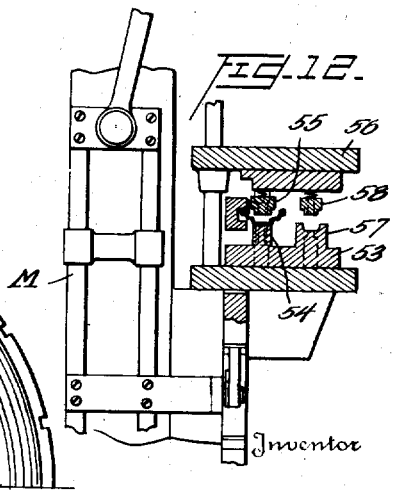
Figure 12 is a section on line 12—12 of Figure 11.
Figure 17:
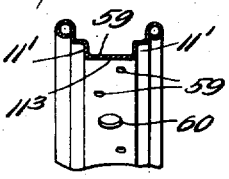
Figure 17 is a similar section illustrating the rim after the completion of the punching operation.
Figure 18:
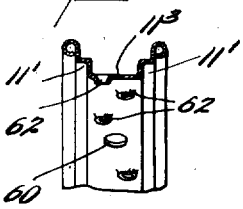
Figure 18 illustrates the rim in section after the operation of forming the spoke-attaching sleeve-retaining elements has been performed.
Figure 20:
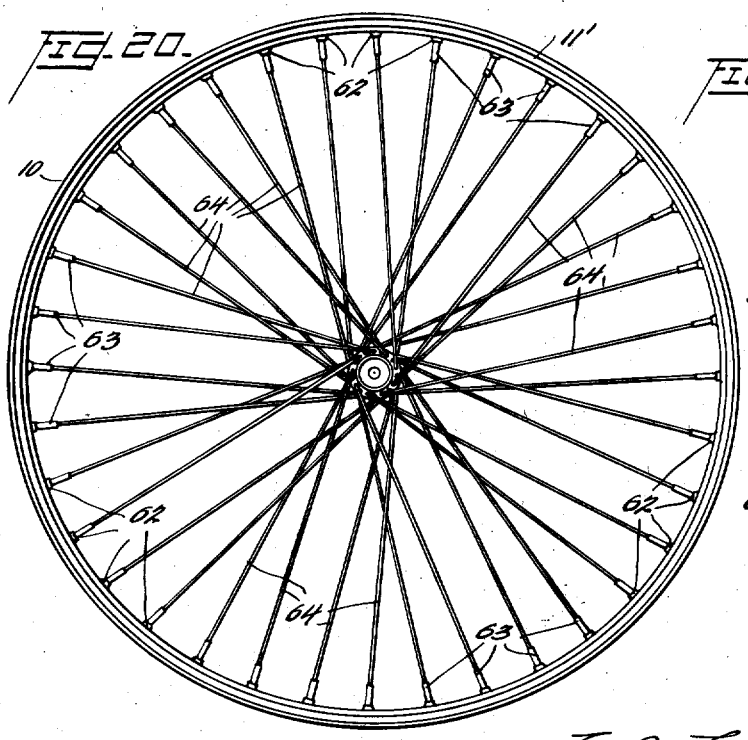
Figures 20 and 21 are side and end elevations of the completed wheel, a portion of Figure 21 being broken away to show the rim in section.
Figure 21:
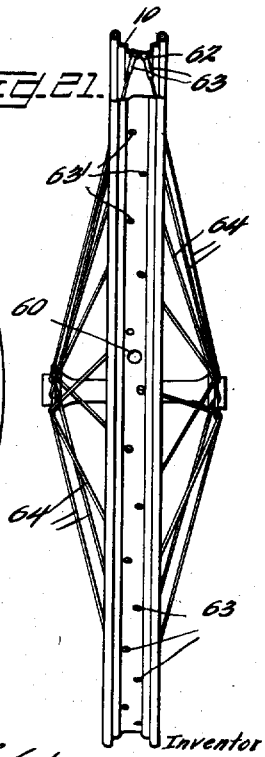

The machine shown in Figures 11 and 12 includes a rotatable support 53 upon which the blank may be mounted in either of two positions; that is, it may be supported upon an annular member 54 so that successive sections of the blank pass beneath two spaced punches 55 mounted upon a reciprocating head 56, or it may be mounted upon a support 57 which underlies a punch 58 also mounted on reciprocating head 56. The spaced punches 55 perforate the central cylindrical portion $11^3$ of the blank at circumferentially spaced points, the perforations being relatively small, as may be seen at 59 in Figure 17, and the punch 58 forms in the blank a larger aperture 60, also shown in Figure 17, for the reception of the tube which leads to the tire and by means of which the tire may be inflated. Only one aperture 60 is, of course, formed in the blank, but a plurality of apertures 59 are so formed, there being one such aperture provided for each spoke which the resulting wheel is to have. For advancing the support 53 and the blank mounted thereon and for insuring proper spacing of the holes 59, an indexing mechanism, which is generally indicated at M, is provided.

The next operation consists in drawing inwardly, to form generally tubular elements 62, the margins of the apertures 59. This operation is performed by means of drawing dies manually or mechanically operated, to draw the margins of these apertures inwardly to provide tubular supporting elements for the spoke end attaching sleeves or nuts, one of which is illustrated at 63 in Figure 19, this sleeve being interiorly threaded so as to have threaded engagement with the outer end of the spoke 64 which projects within the same. The elements 62 may be said to be frusto-conical, tapering inwardly of the rim, and the drawing operations are performed with care so that the axes of these frusto-conical elements are coincident with the axes of the sleeve 63 and spoke 64 after the spokes and sleeves have been assembled with the rim.

Figure 19:
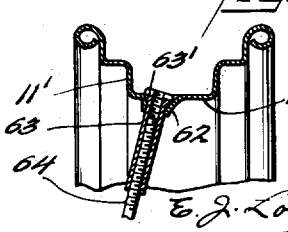
Figure 19 is a section similar to Figure 18 but showing a spoke end attaching sleeve or nut in position.

As will be seen from Figure 19, each sleeve 63 has an enlarged head 63', but the elements 62 are so formed that these enlarged heads are housed almost entirely within the elements and thus do not extend into the space which is ordinarily occupied by the tire. When completed, therefore, the wheel has a substantially smooth tire-receiving groove which renders unnecessary the use of the liner heretofore deemed essential for the protection of the inner surface of the inner tube. The assembly of the spokes with the rim and with the hub is completed in the usual manner, and the wheel is ready for use.

By reason of the deformation of the blank in the manner above described, involving the use of outwardly directed forces which result in uniform circumferential stretching or expansion of the lateral edges of the blank, a rim is produced which has been subjected to identical treatment in every cross section, and no internal stresses are set up which tend to cause the rim to distort in use. The rim, therefore, possesses the important advantage of increased rigidity and durability over metallic rims of generally similar cross section, but formed by different methods. The rim, if made of corrosion-resisting metal, will retain a bright surface for the life of the wheel, but it may, of course, be fabricated of less expensive material, if desired, and painted or enamel in well-known manner.

Having thus described the invention, what is claimed as new and desired to be secured by Letters Patent is:

1. The method of fabricating a metallic rim for bicycle wheels which comprises securing together the ends of a relatively thin flat strip of ductile metal to form an endless band having the internal diameter of the finished rim and thereafter expanding the outer marginal portions of said band while internally and externally holding the annular central portion thereof against change in size.

2. The method of fabricating wheel rims having a well, which comprises the steps of forming an endless band of a diameter substantially corresponding to the base of the well of the rim, expanding in diameter portions on opposite sides of that portion for forming the well base, maintaining the diameter of the last mentioned portion, and while the diameter is being maintained applying pressure to the expanded portions by means of dies to thereby form portions including the sides of the well.

3. The method of fabricating a wheel rim having a well, which comprises the steps of forming an endless band of a diameter substantially corresponding to the base of the well of the rim, expanding in diameter portions on opposite sides of the portion for forming the well base by means of dies applied in opposite directions, maintaining the diameter of the last mentioned portion, and while the diameter is being maintained applying pressure to the expanded portions by means of dies applied in opposite directions to move the same axially inward and form thereof the sides of the well.

4. The method of fabricating a drop-center wheel rim, which comprises the steps of forming an endless band of a diameter substantially corresponding to the base of the well of the rim, expanding in diameter portions on opposite sides of that portion for forming the well base, maintaining the diameter of the last mentioned portion, and while the diameter is being maintained refashioning the expanded portions while the same are capable of moving laterally inward to thereby form transversely extending portions forming the sides of the well, the bead seats and the flanges.

5. The method of forming a wheel rim having a well, which comprises the steps of forming an endless band of a diameter substantially corresponding to the base of the well of the rim, expanding in diameter portions on opposite sides of that portion for forming the well base, maintaining the diameter of the last mentioned portion, and while the diameter is being maintained applying pressure to the axially outer faces of the expanded portions to move the same axially inward and to fashion therefrom the sides of the well.

6. The method of fabricating drop-center wheel rims, which comprises the steps of forming an endless band of a diameter substantially corresponding to the base of the well of the rim, expanding in diameter portions on opposite sides of that portion for forming the well base, maintaining the diameter of the last mentioned portion, and while the diameter is being maintained, applying pressure to the outer faces of the expanded portions to move the same axially inward and radially outward thereby forming the sides of the well, the bead seats and the flanges and subsequently refashioning the free edges of the flanges thereby forming beads.

7. In a method of forming drop-center wheel rims, the steps of forming an endless band of a diameter substantially corresponding to the base of the well of the rim, applying pressure simultaneously throughout the circumferential extent of each portion at each side of that portion for forming the well base to expand each side portion, maintaining the diameter of the portion for forming the well base, and while the diameter is being maintained applying pressure in an axially inward and radially outward direction to each expanded portion simultaneously throughout its circumferential extent to move the same axially inward and radially outward thereby forming the sides of the well, the bead seats, and the flanges.

8. In a method of forming a wheel rim having a well, the steps of forming an endless band of a diameter substantially corresponding to the base of the well of the rim, applying pressure simultaneously throughout the circumferential extent of each portion at each side of that portion for forming the well base to expand each side portion while yieldably opposing the movement of and guiding each side portion, applying pressure simultaneously throughout the circumferential extent of each expanded portion while maintaining substantially unchanged the portion for forming the well base thereby forming the sides of the well and other parts of the rim.

9. The method of fabricating a metallic rim for bicycle wheels, which comprises forming a continuous substantially cylindrical band of a relatively thin ductile metal having the internal diameter of the finished rim, and expanding the margins of the band simultaneously throughout their circumferential extents by wedging means movable axially of the band to form flanges while internally and externally restraining the annular mid-portion to prevent expansion thereof.

10. In a method of forming a wheel rim having a well, the steps of forming an endless band of a diameter substantially corresponding to the base of the well of the rim, applying pressure simultaneously throughout the circumferential extent of each portion at each side of that portion for forming the well base to expand each side portion while yieldably opposing the movement of and guiding each side portion, maintaining substantially unchanged the diameter of the portion for forming the well base, and while the diameter is being maintained refashioning the expanded portions to thereby form portions including the sides of the well.

11. The method of fabricating a rim having a well, which comprises the steps of forming an endless band of a diameter substantially corresponding to the base of the well of the rim, expanding the marginal portions of the band by simultaneously applying outwardly directed forces throughout the circumferential extents of the internal surfaces of the marginal portions, and thereafter refashioning the expanded portions while holding the intermediate portion substantially unchanged to thereby form portions of the rim including the sides of the well.

EDWARD J. LOBDELL, JR.